US009657145B2

(12) United States Patent
Sotzing et al.

(10) Patent No.: US 9,657,145 B2
(45) Date of Patent: May 23, 2017

(54) METAL ESTER POLYMER COMPOSITIONS, METHODS OF MANUFACTURE, AND USES THEREOF

(71) Applicant: THE UNIVERSITY OF CONNECTICUT, Farmington, CT (US)

(72) Inventors: Gregory Allen Sotzing, Storrs, CT (US); Aaron Baldwin, Canterbury, CT (US)

(73) Assignee: THE UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 14/950,940

(22) Filed: Nov. 24, 2015

(65) Prior Publication Data

US 2016/0222171 A1 Aug. 4, 2016

Related U.S. Application Data

(60) Provisional application No. 62/109,347, filed on Jan. 29, 2015.

(51) Int. Cl.
*C08G 63/02* (2006.01)
*C08G 79/00* (2006.01)
*C08G 79/10* (2006.01)
*C08G 79/14* (2006.01)
*C08G 64/00* (2006.01)

(52) U.S. Cl.
CPC ............. *C08G 79/00* (2013.01); *C08G 79/10* (2013.01); *C08G 79/14* (2013.01)

(58) Field of Classification Search
CPC ................................ C08G 63/78; C08G 67/04
USPC .......................................... 528/271, 272, 274
See application file for complete search history.

(56) References Cited

U.S. PATENT DOCUMENTS

| | | | |
|---|---|---|---|
| 3,426,002 | A | 2/1969 | Frankel et al. |
| 4,231,949 | A | 11/1980 | Ceprini et al. |
| 4,292,252 | A | 9/1981 | Collins et al. |
| 5,446,112 | A | 8/1995 | Hamilton et al. |
| 8,557,672 | B2 | 10/2013 | Forbes et al. |
| 8,613,975 | B2 | 12/2013 | Chalker et al. |
| 8,653,573 | B2 | 2/2014 | Vaartstra |
| 2016/0222172 | A1 | 8/2016 | Sotzing et al. |

FOREIGN PATENT DOCUMENTS

| | | | |
|---|---|---|---|
| CN | 101838279 A | 9/2010 | |
| JP | 54088319 | * 7/1979 | ............ C08G 63/00 |
| JP | 54088319 A | 7/1979 | |

OTHER PUBLICATIONS

Aaron F. Baldwin et al. Rational Design of Organotin Polyesters Macromolecules 2015, 48, 2422-2428.*
Arbatti, M. et al., "New high-dielectric-constant polymer-ceramic composites", Materials Research Society symposia proceedings, 2005, pp. 327-332, vol. 847.
Baldwin et al. "Poly(dimethyltin glutarate) as a Prosepective Material for High Dieleteric Applications" Macromolecular Rapid Communications, 2014, 35(21): 2082-2088.
Baldwin et al., Effect of Incorporating Aromatic and Chiral Groups on the Dielectric Properties of Poly(dimethyltin esters) Macromolecular Rapid Communications, 2014 35(24):2082-2088.
Baldwin, A. et al, "Rationally Designed Poly(dimethyltin esters) as High Dielectric Constant Organometalic Polymers for Energy Storage Applications", Adv. Matter 27, 346 (2015) Abstract only.
Baldwin, Aaron, "Synthesis of Next Generation Dielectric Materials through Rational Exploration of Chemical Space" (2014). Doctoral Dissertations. Paper 464.
Carraher, C. E., "Organotin Polymers", Macromolecules Containing Metal and Metal-Like Elements: Group IVA Polymers, 2005, vol. 4, Ch. 10, pp, 263-310, John Wiley & Sons, Inc., Hoboken, NJ.
Carraher, C. et al, "Lead (IV) Polyesters From a New Solution System" Organometallic Polymers, 1978, pp. 101-106.
Florjanczyk et al., "Polymer electrolytes based on PEO and aluminium carboxylates" Solid State Ionics, 2002 152-153():227-234.
Frankel et al., "Organotin Polyesters" Journal of Applied Polymer Science, 1965 9(10):3383-3388.
Song et al., "Improving the dielectric constants and breakdown strength of polymer composites: effects of the shape of the BaTiO3 nanoinclusions, surface modification and polymer matrix" Journal of Materials Chemistry, 2012 22 (32):16491-16498.
Tran, H. et al, "First-principles design of organotin polymeric dielectrics", Institute of Materials Science, University of Connecticut, APS March Meeting, Mar. 3, 2014, Denver, CO.
Tran, H. et al, "Organotin polymeric dielectrics for energy-storage applications", Institute of Materials Science, University of Connecticut, APS March Meeting, Mar. 3, 2014, Abstract.
Carraher et al. "Production of organometallic polymers by the interfacial technique. XV. Synthesis and partial reaction characterization of some group IV polyesters," 1970, Polymer Preprints (Amer Chem. Society, Div. of Polymer Chemistry), 11, 606-612.
Carraher et al., "Comparative synthesis of oligometic group IV polyesters." Journal of Polymer Science Part A- 1: Polymer Chemistry 10.2 (1972): 413-417.
Carraher et al., "Production of organometallic polymers by the interfacial technique. XI. Synthesis of poly (organotin esters) and a study of some associated reaction variables." Die Makromolekulare Chemie 135.1 (1970): 107-112.

* cited by examiner

*Primary Examiner* — Terressa Boykin
(74) *Attorney, Agent, or Firm* — Cantor Colburn LLP

(57) ABSTRACT

Disclosed are transition metal or group II metal ester polymers where the metal is an alkaline earth, transition metal or aluminum; methods of manufacture, and uses thereof. The metal ester polymers exhibit both high dielectric constant and low conductivity suitable for use as dielectric insulating materials.

16 Claims, 1 Drawing Sheet

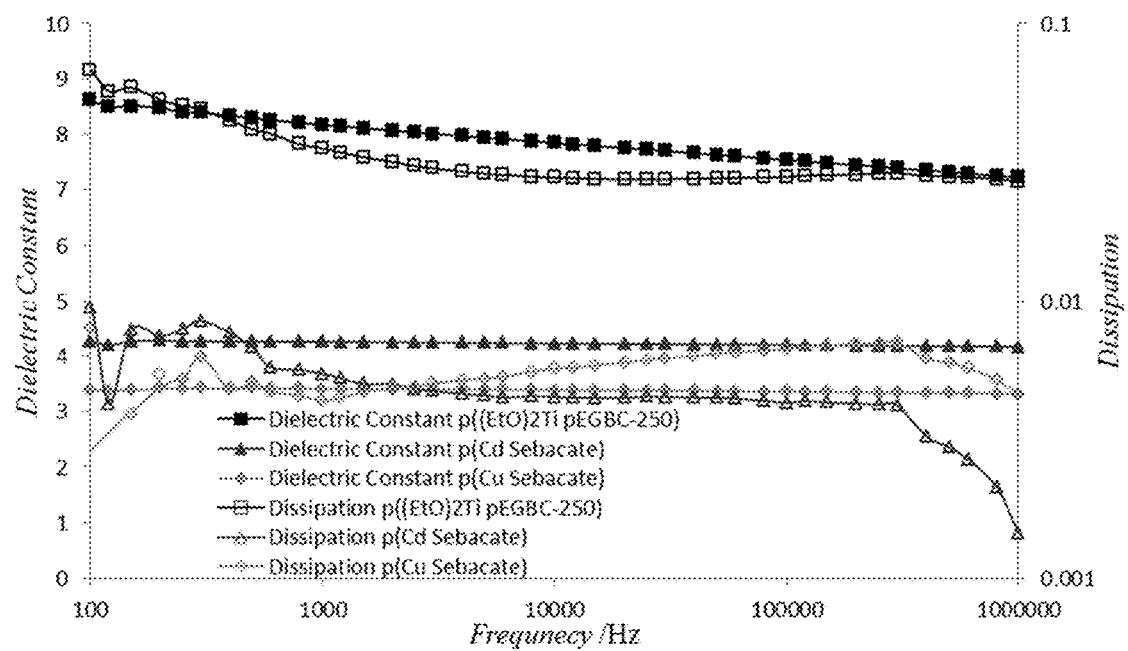

METAL ESTER POLYMER COMPOSITIONS, METHODS OF MANUFACTURE, AND USES THEREOF

CROSS REFERENCE TO RELATED APPLICATION

This application claims the benefit of U.S. Provisional Application No. 62/109,347 filed Jan. 29, 2015, which is hereby incorporated by reference in its entirety.

Government License Rights

This invention was made with government support under U.S. Office of Naval Research Grant No. N00014-10-1-0944 awarded by the U.S. Office of Naval Research. The U.S. government has certain rights in the invention.

BACKGROUND

This disclosure relates to metal ester polymers, methods of manufacture, and uses thereof, for example as dielectric insulating materials.

Dielectric insulating materials used in applications such as capacitors, field effect transistors, electromechanical systems and photovoltaics desirably have a large dielectric constant (Dk), a large energy band gap, low loss, and low conductivity. It is a further advantage if the materials are light-weight and readily manufactured. Current commercially available insulating materials include ceramics and certain polymers. Commercial polymers for use as dielectric materials include polyolefins, due to the favorably low conductivity of these materials. Compared to dielectric ceramics, these polymers meet industry needs for lighter weight and easier processing. On the other hand, such polymers are known to have either a low dielectric constant or low band gap, or both, making them less suitable for the target applications.

To increase the dielectric constant of insulating polymers, two methods have been used. One approach includes incorporating a larger permanent dipole moment within the polymer backbone to increase orientational polarization. The approach has been applied to polyvinyldiene fluoride (PVDF) since it has a large band gap (about 6 eV). A second approach has been the addition of inorganic, high dielectric constant fillers to introduce interfacial polarization between the filler particles and polymer. However, both of these methods have limitations. Although PVDF has a dielectric constant of greater than 10, it is ferroelectric in nature and suffers from large dielectric losses. Filled insulating polymers require large volumes of particles to reach percolation of the dielectric constant and, as a result, can suffer from a decrease in the dielectric breakdown field.

There accordingly remains a need in the art for polymeric materials that exhibit a high dielectric constant, high energy band gap, low loss, and low conductivity, properties that make these polymeric materials suitable for use in applications including high energy density capacitors, printed circuits, and gate dielectrics for transistors.

SUMMARY

Disclosed herein are transition metal or group II metal ester polymers comprising units of formula (I), (II), or (III):

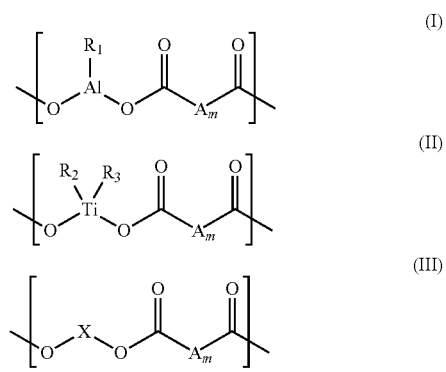

wherein
$R_1$ is halogen, —OH, $H_2O$, amine, substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkynyl, or substituted or unsubstituted $C_{2-12}$ alkynyl;
$R_2$ and $R_3$ are each independently $C_{1-12}$ alkoxy, amine, mono$C_{1-12}$ alkyl amine, or di $C_{1-12}$ alkyl amine;
X is Ca, Cd, Cu, Zn, or a combination thereof,
A is substituted or unsubstituted $C_{1-36}$ hydrocarbylene, a divalent heteroaryl, or an ether; and
m is 0 or 1.

Further disclosed are processes for producing the above-described polymers, e.g. comprising contacting an organic dicarboxylic acid or derivative thereof and a diorganoaluminum halide. Another exemplary process comprises contacting an organic dicarboxylic acid or derivative thereof and a metal dihalide, wherein the metal is Ca, Cd, Cu, Zn, or a combination thereof. Another exemplary process comprises contacting an organic dicarboxylic acid or derivative thereof and a dialkoxytitanium dihalide.

Also disclosed herein are compositions and articles comprising the above-described polymers, in particular the article can be a dielectric substrate for use in electronic articles.

BRIEF DESCRIPTION OF THE DRAWINGS

The FIGURE shows frequency domain measurements of poly(diethoxytitanium pEBGC-250) (square), poly(cadmium sebacate) (triangle) and poly(copper sebacate) (diamond).

DETAILED DESCRIPTION

The inventors hereof have discovered transition metal or group II metal ester polymers (collectively "metal ester polymers") and compositions comprising the metal ester polymers that exhibit both high dielectric constant and low conductivity. Without being bound by theory, it is believed that the high dielectric constant is achieved through the binding of the metal (e.g. Al, Ca, Cd, Cu, Zn, Ti) to an electronegative heteroatom such as N, O, or S. As a result of such binding, the large difference in electronegativity between metal and the heteroatom gives rise to a higher dipole moment and, therefore, a higher dipolar orientation within the polymer. In addition it is believed that due to the affinity of these metals to coordinate heteroatoms preferentially, the polymer backbone will be oriented in a number of complex octahedral structures. Each of these structures will affect the total dielectric constant since there is a difference in both dipolar and ionic orientation. The inventors have further discovered that the dielectric constant of these polymers can be further increased through coordination of small, high dielectric constant ligands, such as water, ammonia, or hydrogen sulfide.

The transition metal or group II metal ester polymer comprises units of formula (I), (II), or (III):

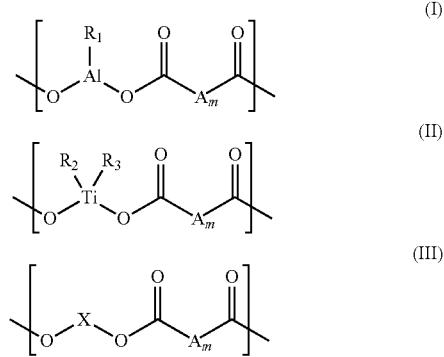

wherein $R_1$ is halogen, —OH, $H_2O$, amine, substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkynyl, or substituted or unsubstituted $C_{2-12}$ alkynyl;

$R_2$ and $R_3$ are each independently $C_{1-12}$ alkoxy, amine, mono$C_{1-12}$ alkyl amine, or di $C_{1-12}$ alkyl amine;

X is Ca, Cd, Cu, Zn, or a combination thereof;

A is a substituted or unsubstituted $C_{1-36}$ hydrocarbylene, a divalent heteroaryl, or an ether; and m is 0 or 1.

In formula (I), $R_1$ is halogen, —OH, $H_2O$, amine, substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkynyl, or substituted or unsubstituted $C_{2-12}$ alkynyl; specifically halogen; and more specifically Cl.

In formula (I), $R_2$ and $R_3$ are each independently $C_{1-12}$ alkoxy, amine, mono$C_{1-12}$ alkyl amine, or di $C_{1-12}$ alkyl amine; specifically substituted or unsubstituted —$OC_{1-12}$ alkyl, substituted or unsubstituted —$OC_{3-12}$ cycloalkyl, substituted or unsubstituted —$OC_{6-12}$ aryl, substituted or unsubstituted —$OC_{3-6}$ heteroalkyl, substituted or unsubstituted —$OC_{2-12}$ alkynyl, or substituted or unsubstituted —$OC_{2-12}$ alkynyl. In an embodiment, $R_2$ and $R_3$ are each independently substituted or unsubstituted —$OC_{1-12}$ alkyl, for example substituted or unsubstituted —$OC_{1-8}$ alkyl, specifically unsubstituted —$OC_{1-6}$ alkyl. In an embodiment, $R_2$ and $R_3$ are both -OEt.

Further in Formula (I), (II), and (III), m is 0 or 1. When m is 0, a single bond connects the two carbonyl carbon atoms. A is a divalent group such as a substituted or unsubstituted $C_{1-36}$ hydrocarbylene, a divalent heteroaryl, or an ether. In an embodiment, A is a divalent group such as substituted or unsubstituted $C_{1-36}$ hydrocarbylene, preferably substituted or unsubstituted $C_{1-12}$ alkyl, substituted or unsubstituted $C_{3-12}$ cycloalkyl, substituted or unsubstituted $C_{6-12}$ aryl, substituted or unsubstituted $C_{3-6}$ heteroalkyl, substituted or unsubstituted $C_{2-12}$ alkenyl, or substituted or unsubstituted $C_{2-12}$ alkynyl, and preferably substituted or unsubstituted $C_{1-12}$ alkyl, more preferably unsubstituted $C_{1-8}$ alkyl. A can be a divalent substituted or unsubstituted $C_{1-36}$ alkyl whose chain is interrupted by one or more units of substituted or unsubstituted $C_{6-12}$ aryl or one or more units of substituted or unsubstituted $C_{6-12}$ heteroaryl. A can be a substituted or unsubstituted $C_{6-12}$ heteroaryl. A can be an ether such as —O—(—$R_4$—O—)$_n$—wherein each $R_4$ is independently a divalent $C_{1-8}$ alkyl or divalent $C_{3-12}$ cycloalkyl, and n is 1 to 12, specifically 1 to 10, and more specifically 1 to 6.

Specific examples of the metal ester polymers include poly(chloroaluminum glutarate), poly(chloroaluminum sebacate), poly(chloroaluminum poly(ethyleneglycol)bis(carboxymethyl)ether-250), poly(chloroaluminum poly(ethyleneglycol)bis(carboxymethyl)ether-600), poly(chloroaluminum 20:80 glutarate:poly(ethyleneglycol)bis(carboxymethyl)ether-600), poly(chloroaluminum 50:50 glutarate:poly(ethyleneglycol)bis(carboxymethyl)ether-600), poly(chloroaluminum 80:20 glutarate:poly(ethyleneglycol)bis(carboxymethyl)ether-600), poly(chloroaluminum 50:50 poly(ethyleneglycol)bis(carboxymethyl)ether-250:3,3-dimethylglutarate), poly(chloroaluminum 60:40 poly(ethyleneglycol)bis(carboxymethyl)ether-250:3,3-dimethylglutarate), poly(chloroaluminum 75:25 poly(ethyleneglycol)bis(carboxymethyl)ether-250:3,3-dimethylglutarate), poly(chloroaluminum 80:20 poly(ethyleneglycol)bis(carboxymethyl)ether-250:3,3-dimethylglutarate), poly(chloroaluminum 90:10 poly(ethyleneglycol)bis(carboxymethyl)ether-250:3,3-dimethylglutarate), poly(chloroaluminum 95:5 poly(ethyleneglycol)bis(carboxymethyl)ether-250:3,3-dimethylglutarate), poly(cadmium sebacate), poly(copper sebacate), poly(zinc sebacate), poly(50:50 cadmium:zinc sebacate), poly(calcium sebacate), poly(diethoxytitanium poly(ethyleneglycol)bis(carboxymethyl)ether-250), or combinations comprising at least one of the foregoing.

Any of the foregoing polymers can be further coordinated with a high dielectric constant ligand, preferably a small, high dielectric constant molecular ligand, such as water; ammonia; hydrogen sulfide; an alcohol such as methanol, ethanol, propanol, and the like; an amine such as methylamine, ethylamine, propylamine, and the like; or a thiol such as methane thiol, ethane thiol, and the like.

The aluminum ester polymers can be manufactured by the reaction of an organic dicarboxy compound, preferably a dicarboxylic acid or a derivative thereof, with a diorganoaluminum halide.

The dicarboxy compounds include dicarboxylic acids and reactive derivatives thereof, for example acyl halides such as acyl chlorides, esters, and the like. Specific examples of organic dicarboxylic acids are oxalic acid, malonic acid, succinic acid, glutaric acid, adipic acid, pimelic acid, suberic acid, azelaic acid, sebacic acid, dodecanedioic acid, dimethylglutaric acid (e.g. 2,2-isomer, 3,3-isomer, 2,4-isomer), poly(ethylene glycol)bis(carboxymethyl)ether-250, terephthalic acid, poly(ethyleneglycol)bis(carboxymethyl)ether-600, isophthalic acid, 2,5-pyridinedicarboxylic acid, 2,6-pyridinedicarboxylic acid, 2,5-thiophenedicarboxylic acid, L-tartaric acid, D-tartaric acid, DL-tartrate) to mention a few. Combinations comprising at least one of the foregoing can be used.

Examples of diorganoaluminum halides include dialkyl aluminum halides such as dimethylchloroaluminum, diethylchloroaluminum, dipropylchloroaluminum, preferably diethylchloroaluminum. Combinations comprising at least one of the foregoing can be used.

The process for producing the aluminum ester polymer comprises contacting the dicarboxy compound and the diorganoaluminum halide, optionally in a solvent, optionally in the presence of a catalyst, at a temperature and pressure effective to produce the aluminum ester polymer.

A molar excess of the dicarboxy compound, based on diorganoaluminum halide, can be used, for example, the molar excess of organic dicarboxy compound, based on moles diorganoaluminum halide, is 5%, 10%, 15%, and 20%.

Further according to the process, the dicarboxy compound can be dissolved in as solvent such as an aprotic solvent. Exemplary solvents include dimethoxyethane, 1,2-dichloroethane, N,N-dimethylformamide, N,N-dimethylacetamide, acetonitrile, tetrahydrofuran, toluene, and the like, or combinations comprising at least one of the foregoing.

Contacting the dicarboxy compound or solution thereof and the diorganoaluminum halide can be in the presence of a solvent. Suitable solvents are dimethoxyethane, 1,2-dichloroethane, N,N-dimethylformamide, N,N-dimethylacetamide, acetonitrile, tetrahydrofuran, or toluene, and the like, or combinations comprising at least one of the foregoing.

Contacting the organic dicarboxy compound, preferably the dicarboxylic acid and dialkyaluminum halide leads to a precipitate. The precipitate can be filtered off, optionally washed with additional solvent, and dried to remove any residual solvent. Drying can be under vacuum, or at atmospheric pressure. In one embodiment, drying is at a temperature in the range of 40 to 200° C., preferably 60 to 150° C. Drying can also be for a period of 1-50 hours, preferably 5-30 hours.

In another embodiment, the metal ester polymers can be manufactured by the reaction of an organic dicarboxy compound, preferably a dicarboxylic acid or a derivative thereof, with a metal dihalide, wherein the metal is Ca, Cd, Cu, Zn, or a combination thereof.

The dicarboxy compounds include those previously discussed.

Examples of the metal dihalides include metal dichlorides such as $CaCl_2$, $CdCl_2$, $CuCl_2$, $ZnCl_2$, and the like. Combinations comprising at least one of the foregoing can be used.

The process for producing the metal ester polymer comprises contacting the dicarboxy compound and the metal dihalide, optionally in a solvent, optionally in the presence of a catalyst, at a temperature and pressure effective to produce the metal ester polymer.

A molar excess of the dicarboxy compound, based on metal dihalide, can be used, for example, the molar excess of organic dicarboxy compound, based on moles metal dihalide, is 1%, 5%, 10%, 15%, and 20%.

Further according to the process, the dicarboxy compound can be dissolved in water with a base to provide an aqueous solution, for example combined with greater than or equal to 2.01 equivalents, with respect to the dicarboxylic acid, of a base. The base can also be added in amounts of 2.05, 2.08, 2.1, 2.15, 2.2, 2.3, and 2.5 equivalents with respect to the dicarboxy compound. Exemplary bases are organoamines, preferably alkylamines such as triethyl amine and the like, hydroxides and oxides of alkali and alkaline earth metals, preferably lithium hydroxide, sodium hydroxide, potassium hydroxide, magnesium hydroxide, calcium hydroxide, more preferably sodium hydroxide, potassium hydroxide, and the like, or combinations comprising at least one of the foregoing.

Contacting the dicarboxy compound or aqueous solution thereof and the metal dihalide can be in the presence of a solvent. Suitable solvents are water, tetrahydrofuran, dioxane, acetone, ethyl acetate, and the like, or combinations comprising at least one of the foregoing.

Contacting the organic dicarboxy compound, preferably the dicarboxylic acid and metal dihalide leads to a precipitate. The precipitate can be filtered off, optionally washed with additional solvent water, and dried to remove any residual solvent and water. Drying can be under vacuum, or at atmospheric pressure. In one embodiment, drying is at a temperature in the range of 40 to 200° C., preferably 60 to 150° C. Drying can also be for a period of 1-50 hours, preferably 5-30 hours.

In another embodiment, the organotitanium ester polymers can be manufactured by the reaction of an organic dicarboxy compound, preferably a dicarboxylic acid or a derivative thereof, with a dialkoxytitanium dihalide.

The dicarboxy compounds include those previously discussed.

Examples of dialkoxytitanium dihalides include dimethoxydichlorotitanium, diethoxydichlorotitanium, and the like, preferably diethoxydichlorotitanium. Combinations comprising at least one of the foregoing can be used.

The process for producing the organotitanium ester polymer comprises contacting the dicarboxy compound and the dialkoxytitanium dihalide, optionally in a solvent, optionally in the presence of a catalyst, at a temperature and pressure effective to produce the organotitanium ester polymer.

Further according to the process, the dicarboxy compound can be dissolved in as solvent such as an aprotic solvent. Exemplary solvents include dimethoxyethane, 1,2-dichloroethane, N,N-dimethylformamide, N,N-dimethylacetamide, acetonitrile, tetrahydrofuran, toluene, and the like, or combinations comprising at least one of the foregoing.

Further according to the process, the dicarboxy compound can be dissolved in solvent and combined with a base, for example combined with greater than or equal to 2.01 equivalents, with respect to the dicarboxylic acid, of a base. The base can also be added in amounts of 2.05, 2.08, 2.1, 2.15, 2.2, 2.3, and 2.5 equivalents with respect to the dicarboxy compound. Exemplary bases are organoamines, preferably alkylamines such as triethyl amine and the like, hydroxides and oxides of alkali and alkaline earth metals, preferably lithium hydroxide, sodium hydroxide, potassium hydroxide, magnesium hydroxide, calcium hydroxide, more preferably sodium hydroxide, potassium hydroxide, and the like, or combinations comprising at least one of the foregoing.

Contacting the dicarboxy compound or solution thereof and the dialkoxytitanium dihalide can be in the presence of a solvent. Suitable solvents are dimethoxyethane, 1,2-dichloroethane, N,N-dimethylformamide, N,N-dimethylacetamide, acetonitrile, tetrahydrofuran, or toluene, and the like, or combinations comprising at least one of the foregoing.

Contacting the organic dicarboxy compound, preferably the dicarboxylic acid and dialkoxytitanium dihalide can lead to a precipitate. The precipitate can be filtered off, optionally washed with additional solvent, and dried to remove any residual solvent. Drying can be under vacuum, or at atmospheric pressure. In one embodiment, drying is at a temperature in the range of 40 to 200° C., preferably 60 to 150° C. Drying can also be for a period of 1-50 hours, preferably 5-30 hours.

The polymers, including polymers made by the foregoing processes, can have a number of advantageous properties, including high static dielectric constant and high-temperature stability.

The static dielectric constant, ∈, is an essential factor in assessing the effectiveness of a capacitor dielectric. It can be a measure of a substance's ability to insulate charges from each other. Higher ∈ can mean higher polarity for the material, and greater ability to stabilize charges, thereby acting as a better dielectric/insulator. In some embodiments, the compositions exhibit a dielectric constant (∈) of 3-8, or greater than or equal to 4.0, preferably greater than or equal to 4.5, more preferably greater than or equal to 5.0, most preferably greater than or equal to 5.5.

In an embodiment, the polymers display a thermogravimetric analysis (TGA) onset temperature of 200-300° C. or more, or greater than or equal to 200° C., preferably greater than or equal to 210° C., more preferably greater than or equal to 215° C.

The polymers, including polymers made by the foregoing processes, may have a number average molecular weight ($M_n$) of 20,000 g mol$^{-1}$ or greater, specifically in the range of 20,000 to 150,000 g mol$^{-1}$, preferably 30,000 to 100,000 g mol$^{-1}$, more preferably 40,000 to 80,000 g mol$^{-1}$.

The metal ester polymers can be used as an insulating dielectric material in a variety of articles, especially electronic articles. Examples of these articles include capacitors, field effect transistors, electromechanical systems, printed circuits, and photovoltaics.

The metal ester polymers provide a number of advantages in these applications. In capacitors, their use can reduce the size of the capacitor bank, and increase the temperature for operation possibly avoiding current techniques for cooling. The same size capacitor bank would store energy equivalent to the multiple of the dielectric constant of the metal ester polymer in comparison to known polymers such as biaxially oriented polypropylene (BOPP). For example, BOPP has a dielectric constant of about 2.2. For aluminum ester polymers having a dielectric constant of >6, then the same amount of material as BOPP would store 2.5 times more energy. In gate dielectrics for flexible display transistors, the metal ester polymers are flexible, and are thermoplastic and thus could be printed. The metal ester polymers having a high refractive index could be used for refractive index matching for optics applications to reduce Fresnel reflective losses in displays, eyewear, or windows.

The following examples are prospective, and further illustrate the invention, and are for illustrative purposes only and are not to be construed as limiting in any manner.

EXAMPLES

Instrumentation and Methods

Dielectric constant measurements were performed either using an IMASS Time Domain Dielectric Spectrometer (TDDS) or Agilent 4284A Precision LCR meter averaging 5 measurements of the capacitance and dissipation over a frequency range of 20 Hz to 1 MHz.

Solution $^1$H NMR was performed on a Bruker DMX 500 high resolution digital NMR spectrometer. All chemical shifts were referenced to acetic acid-$d_4$ (δ=2.04 ppm).

Thermogravimetric Analysis (TGA) was performed using a TA instruments TGA Q500 at a heating rate of 10° C. min$^{-1}$ under nitrogen atmosphere.

Synthesis Procedure for Aluminum Ester Polymers

The general polymerization technique for the formation of aluminum polyesters is as follows. First, a round-bottomed flask is equipped with a stir bar, reflux condenser, addition funnel and rubber septa. The apparatus is flame dried to remove atmospheric water and filled with nitrogen. Upon cooling, an ice bath is placed under the flask and the appropriate amount of diethylchloroaluminum is added. The appropriate amount of diacid is weighed and diluted with 15 mL of dimethoxyethane, N,N-dimethylformamide or N,N-dimethylacetamide and transferred to the addition funnel. The diacid solution is then added drop wise to the aluminum monomer solution at a rate as not to cause the exothermic reaction to proceed to quickly. Upon complete addition of the diacid solution the ice bath is removed and the solution allowed to warm to room temperature, some more solvent may be added to dissolve some of the precipitate, and the reaction proceeds until the evolution of ethane gas ceases. The product is filtered and washed with tetrahydrofuran and acetone and dried in vacuo at 50° C. overnight.

poly(chloroaluminum glutarate) (p(ClAl Glu):

10 mL (25 wt % in toluene, 18.4 mmol) of diethylchloroaluminum is reacted with 2.4381 g of glutaric acid (18.5 mmol) dissolved in dimethoxyethane. Polymer yield is 3.1500 g. IR (KBr): v=3420, 2979, 1589, 1472, 1356, 1327, 1301, 1164, 1065, 1019, 883, 810, 667 cm$^{-1}$. TGA (10° C. min$^{-1}$): N$_2$ (onset): 292° C.

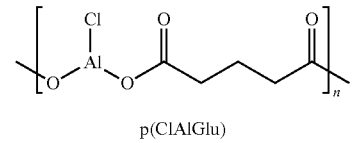

p(ClAlGlu)

poly(chloroaluminum sebacate) (p(ClAl Seb):

10 mL (25 wt % in toluene, 18.4 mmol) of diethylchloroaluminum is reacted with 3.7264 g of sebacic acid (18.4 mmol) dissolved in N,N-dimethylformamide. Polymer yield is 2.2068 g. IR (KBr): v=3438, 2929, 2855, 1653, 1473, 1373, 1325, 1254, 1107, 1064, 652, 519 cm$^{-1}$. TGA (10° C. min$^{-1}$):N$_2$ (onset): 277° C.

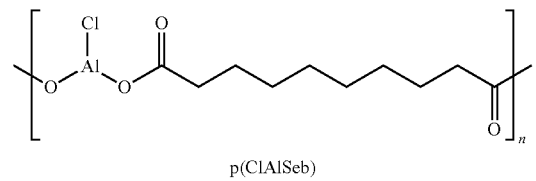

p(ClAlSeb)

poly(chloroaluminum poly(ethyleneglycol)bis(carboxymethyl)ether-250) (p(ClAl pEGBC-250):

10 mL (25 wt % in toluene, 18.4 mmol) of diethylchloroaluminum is reacted with 4.6365 g of pEGBC-250 (18.5 mmol) dissolved in N,N-dimethylacetamide. Polymer yield is 5.8291 g. IR (KBr): v=3421, 2933, 1616, 1476, 1423, 1338, 1295, 1261, 1141, 1109, 1022, 946, 856, 732, 637, 549 cm$^{-1}$. TGA (10° C. min$^{-1}$): N$_2$ (onset): 268° C.

poly(chloroaluminum poly(ethyleneglycol)bis(carboxymethyl)ether-600) (p(ClAl pEGBC-600):

10 mL (25 wt % in toluene, 18.4 mmol) of diethylchloroaluminum is reacted with 11.0434 g of pEGBC-600 (18.4 mmol) dissolved in dimethoxyethane. Polymer yield is 8.6716 g. IR (KBr): v=3371, 2873, 1746, 1583, 1471, 1423, 1348, 1298, 1250, 1108, 951, 848, 731, 582 cm$^{-1}$. DSC (10° C. min$^{-1}$): T$_g$=−25° C. TGA (10° C. min$^{-1}$): N$_2$ (onset): 288° C.

poly(chloroaluminum 20:80 glutarate:poly(ethyleneglycol)bis(carboxymethyl)ether-600) (p(ClAl20:80 pEGBC-600):

10 mL (25 wt % in toluene, 18.4 mmol) of diethylchloroaluminum is reacted with 1.9577 g of glutaric acid (14.8 mmol) and 2.5923 g (4.3 mmol) of pEGBC-600 dissolved in dimethoxyethane. Polymer yield is 4.6491 g.

IR (KBr): v=3429, 2875, 1617, 1474, 1348, 1335, 1301, 1253, 1109, 949, 854, 731, 634, 504 cm$^{-1}$. DSC (10° C. min$^{-1}$): $T_g$=−27° C. TGA (10° C. min$^{-1}$): $N_2$ (onset): 290° C.

poly(chloroaluminum 50:50 glutarate:poly(ethyleneglycol)bis(carboxymethyl)ether-600) (p(ClAl 50:50 pEGBC-600):

10 mL (25 wt % in toluene, 18.4 mmol) of diethylchloroaluminum is reacted with 1.2138 g of glutaric acid (9.2 mmol) and 5.5125 g (9.2 mmol) of pEGBC-600 dissolved in dimethoxyethane. Polymer yield is 9.1011 g. IR (KBr): v=3433, 2874, 1652, 1474, 1426, 1349, 1337, 1301, 1253, 1146, 1113, 949, 855, 732, 636 cm$^{-1}$. DSC (10° C. min$^{-1}$): $T_g$=−28° C. TGA (10° C. min$^{-1}$): $N_2$ (onset): 298° C.

poly(chloroaluminum 80:20 glutarate:poly(ethyleneglycol)bis(carboxymethyl)ether-600) (p(ClAl 80:20 pEGBC-600):

10 mL (25 wt % in toluene, 18.4 mmol) of diethylchloroaluminum is reacted with 0.4962 g of glutaric acid (3.8 mmol) and 8.9848 g (15.0 mmol) of pEGBC-600 dissolved in dimethoxyethane. Polymer yield is 6.5109 g. IR (KBr): v=3431, 2916, 1601, 1472, 1430, 1349, 1334, 1301, 1253, 1108, 951, 849, 639, 508 cm$^{-1}$. TGA (10° C. min$^{-1}$): $N_2$ (onset): 291° C.

poly(chloroaluminum 50:50 poly(ethyleneglycol)bis(carboxymethyl)ether-250:3,3-dimethylglutarate)(p(ClAl 50:50 pEGBC-250:3,3-DMG): 10 mL (25 wt % in toluene, 18.4 mmol) of diethylchloroaluminum is reacted with 1.4732 g of 3,3-dimethyglutaric acid (9.2 mmol) and 2.3095 g (9.2 mmol) of pEGBC-250 dissolved in N,N-dimethylacetamide. Polymer yield is 5.1579 g. IR (KBr): v=3417, 2957, 1616, 1474, 1420, 1334, 1264, 1121, 1026, 977, 897, 855, 735, 628, 510 cm$^{-1}$. TGA (10° C. min$^{-1}$): $N_2$ (onset): 271° C.

poly(chloroaluminum 60:40 poly(ethyleneglycol)bis(carboxymethyl)ether-250:3,3-dimethylglutarate) (p(ClAl 60:40 pEGBC-250:3,3-DMG): 10 mL (25 wt % in toluene, 18.4 mmol) of diethylchloroaluminum is reacted with 1.1805 g of 3,3-dimethylglutaric acid (7.4 mmol) and 2.7777 g (11.1 mmol) of pEGBC-250 dissolved in N,N-dimethylacetamide. Polymer yield is 4.6212 g. IR (KBr): v=3483, 2949, 1670, 1616, 1475, 1420, 1334, 1265, 1151, 1122, 1029, 976, 897, 857, 737, 667, 624, 490 cm$^{-1}$. TGA (10° C. min$^{-1}$): $N_2$ (onset): 272° C.

poly(chloroaluminum 75:25 poly(ethyleneglycol)bis(carboxymethyl)ether-250:3,3-dimethylglutarate)(p(ClAl 75:25 pEGBC-250:3,3-DMG): 10 mL (25 wt % in toluene, 18.4 mmol) of diethylchloroaluminum is reacted with 0.7436 g of 3,3-dimethylglutaric acid (4.6 mmol) and 3.4531 g (13.8 mmol) of pEGBC-250 dissolved in N,N-dimethylacetamide. Polymer yield is 4.5430 g. IR (KBr): v=3415, 2953, 1675, 1624, 1474, 1420, 1334, 1266, 1151, 1120, 1029, 974, 946, 857, 735, 667, 627, 599, 486 cm$^{-1}$. TGA (10° C. min$^{-1}$): $N_2$ (onset): 277° C.

poly(chloroaluminum 80:20 poly(ethyleneglycol)bis(carboxymethyl)ether-250:3,3-dimethylglutarate)(p(ClAl 80:20 pEGBC-250:3,3-DMG): 10 mL (25 wt % in toluene, 18.4 mmol) of diethylchloroaluminum is reacted with 0.5911 g of 3,3-dimethylglutaric acid (3.7 mmol) and 3.6948 g (14.8 mmol) of pEGBC-250 dissolved in N,N-dimethylacetamide. Polymer yield is 4.4348 g. IR (KBr): v=3422, 2949, 1635, 1474, 1420, 1334, 1266, 1119, 1028, 974, 857, 737, 668, 630, 598, 486, 481 cm$^{-1}$. TGA (10° C. min$^{-1}$): $N_2$ (onset): 268° C.

poly(chloroaluminum 90:10 poly(ethyleneglycol)bis(carboxymethyl)ether-250:3,3-dimethylglutarate)(p(ClAl 90:10 pEGBC-250:3,3-DMG): 10 mL (25 wt % in toluene, 18.4 mmol) of diethylchloroaluminum is reacted with 0.2907 g of 3,3-dimethylglutaric acid (1.8 mmol) and 4.1060 g (16.4 mmol) of pEGBC-250 dissolved in N,N-dimethylacetamide. Polymer yield is 4.2629 g. IR (KBr): v=3421, 2935, 1616, 1475, 1423, 1339, 1295, 1261, 1141, 1108, 1022, 966, 947, 867, 732, 638, 543, 484, 455 cm$^{-1}$. TGA (10° C. min$^{-1}$): $N_2$ (onset): 278° C.

poly(chloroaluminum 95:5 poly(ethyleneglycol)bis(carboxymethyl)ether-250:3,3-dimethylglutarate)(p(ClAl 95:5 pEGBC-250:3,3-DMG): 10 mL (25 wt % in toluene, 18.4 mmol) of diethylchloroaluminum is reacted with 0.1455 g of 3,3-dimethylglutaric acid (0.9 mmol) and 4.3601 g (17.4 mmol) of pEGBC-250 dissolved in N,N-dimethylacetamide. Polymer yield is 4.7827 g. IR (KBr): v=3428, 2946, 1624, 1473, 1420, 1334, 1265, 1150, 1118, 1027, 967, 856, 733, 630, 600, 509 cm$^{-1}$. TGA (10° C. min$^{-1}$): $N_2$ (onset): 269° C.

Synthetic Procedure for Transition Metal Polymers

The general procedure for the formation of metal containing polymers is as follows. First in a round-bottom flask the appropriate amount of metal containing monomer is dissolved in 20 mL of water. In an Erlenmeyer flask the appropriate amount of diacid is dissolved in 20 mL of 1,2-dichloroethane. To this solution is added the appropriate amount of triethylamine to deprotonate the diacid. The diacid solution is then added to the rapidly stirred aqueous phase. The precipitate is then filtered, washed with tetrahydrofuran, water and acetone and dried in vacuo at 115° C. overnight. Changes to this procedure are noted in the individual polymer sections.

poly(cadmium sebacate) (p(Cd Seb):

4.9850 g (21.8 mmol) of cadmium chloride is dissolved in water and reacted with 4.4530 g (22.0 mmol) of sebacic acid deprotonated with 4.4711 g (44.2 mmol) of triethylamine to yield 6.1152 g of polymer. IR (KBr): v=3419, 2940, 2853, 1541, 1473, 1453, 1394, 1366, 1324, 1288, 1259, 1191, 1123, 1066, 1050, 1001, 928, 859, 766, 756, 736, 710, 601, 549 cm$^{-1}$. TGA (10° C. min$^{-1}$): $N_2$ (onset): 287° C.

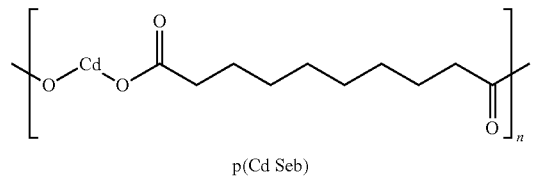

p(Cd Seb)

poly(copper sebacate) (p(Cu Seb):

2.9407 g (21.9 mmol) of copper(II) chloride is dissolved in water and reacted with 4.4715 g (22.1 mmol) of sebacic acid deprotonated with 4.4979 g (44.5 mmol) of triethylamine to yield 5.0186 g of polymer. IR (KBr): v=3447, 2926, 2849, 1590, 1430, 1328, 1316, 1256, 1126, 884, 771, 724, 686, 626, 488, 451, 417 cm$^{-1}$. TGA (10° C. min$^{-1}$): $N_2$ (onset): 255° C.

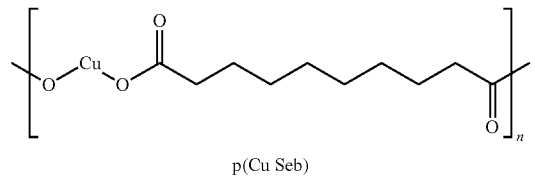

p(Cu Seb)

poly(zinc sebacate) (p(Zn Seb):

2.9419 g (21.6 mmol) of zinc chloride is dissolved in water and reacted with 4.4504 g (22.0 mmol) of sebacic acid deprotonated with 4.4872 g (44.3 mmol) of triethylamine to yield 5.5164 g of polymer. IR (KBr): v=3442, 2925, 2865, 2849, 1590, 1535, 1456, 1410, 1397, 1342, 1271, 1199, 1126, 1067, 1048, 1008, 950, 853, 744, 722, 580, 562, 455 cm$^{-1}$. TGA (10° C. min$^{-1}$): $N_2$ (onset): 317° C.

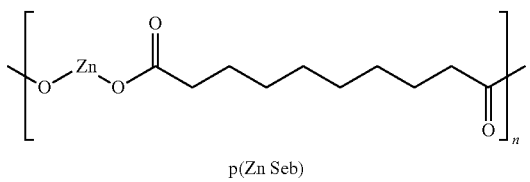

p(Zn Seb)

poly(50:50 cadmium:zinc sebacate) (p(50:50 Zn: Cd Seb):

2.5353 g (11.1 mmol) of cadmium chloride and 1.4430 g (10.6 mmol) of zinc chloride are dissolved in water and reacted with 4.4694 g (22.1 mmol) of sebacic acid deprotonated with 4.4897 g (44.4 mmol) of triethylamine to yield 5.5602 g of polymer. IR (KBr): v=3445, 2940, 2925, 2914, 2850, 1535, 1455, 1410, 1399, 1337, 1305, 1199, 1106, 1067, 1048, 949, 858, 741, 722, 693, 581, 559, 452 cm$^{-1}$. TGA (10° C. min$^{-1}$): $N_2$ (onset): 283° C.

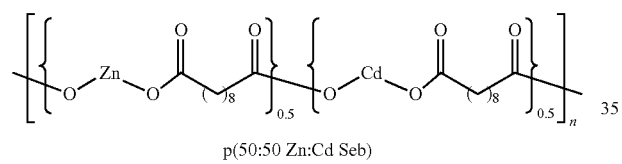

p(50:50 Zn:Cd Seb)

poly(calcium sebacate) (p(Ca Seb):

2.3820 g (21.5 mmol) of calcium chloride is dissolved in water and reacted with 4.4681 g (22.1 mmol) of sebacic acid deprotonated with 4.4681 g (44.2 mmol) of triethylamine to yield 4.7087 g of polymer. IR (KBr): v=3435, 2960, 2929, 2850, 1578, 1469, 1454, 1435, 1410, 1329, 1289, 1264, 1240, 1194, 1120, 1038, 1008, 939, 858, 765, 735, 721, 659, 498, 445 cm$^{-1}$. TGA (10° C. min$^{-1}$): $N_2$ (onset): 433° C.

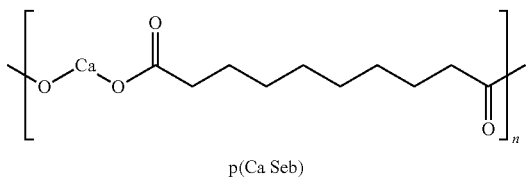

p(Ca Seb)

poly(diethoxytitanium poly(ethyleneglycol)bis(carboxymethyl)ether-250) (p((EtO)$_2$Ti pEGBC-250):

To a round-bottomed flask is added 4.1955 g (16.8 mmol) of pEGBC-250 and 20 mL of acetonitrile. To the solution is added 3.4789 g (34.4 mmol) of triethylamine. In an Erlenmeyer flask, 3.6057 g (17.3 mmol) of diethoxydichlorotitanium is dissolved in 20 mL of acetonitrile. To the rapidly stirred diacid solution is added the titanium solution. The precipitate is then filtered, washed with methanol, water and acetone and dried in vacuo at 115° C. overnight to yield 2.6001 g of polymer. IR (KBr): v=3397, 2925, 1575, 1455, 1417, 1330, 1118, 848, 709, 594 cm$^{-1}$. TGA (10° C. min$^{-1}$): $N_2$ (onset): 253° C.

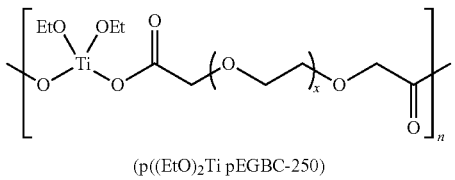

(p((EtO)$_2$Ti pEGBC-250)

The metal polymers form coordination complexes with the carbonyl oxygen atoms of the carboxylate groups. The formation of the metal-oxygen bond is seen in the infrared spectra with the lower energy asymmetric and symmetric stretching absorptions of the carbonyl groups compared with the carbonyl groups of carboxylic acids. The metal-oxygen bond is also present at much lower energies, approximately 450-550 cm$^{-1}$, but is harder to distinguish as the peak intensities vary depending upon the metal. The difference between the asymmetric and symmetric stretching absorptions allow for the type of ligand binding mode to be determined, Table 1. The carbonyl oxygen can form three different types of ligand species, 1) monodentate type in which the carbonyl oxygen does not coordinate and there is only one metal-oxygen bond, 2) bidentate type in which both oxygen atoms bind to the metal center, and 3) a chelation type binding where both oxygen atoms of the carboxylate groups are bound to one metal atom (Scheme 1, M=metal).

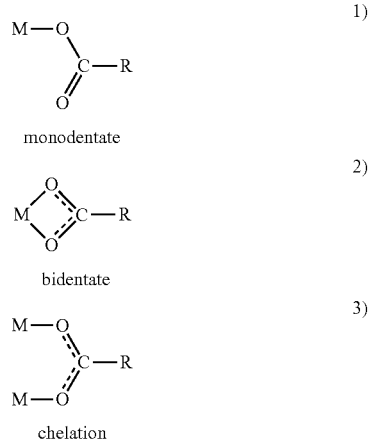

Based on the IR spectra of the metal polymers, each take a bidentate type ligand structure, since the difference between asymmetric and symmetric stretching absorptions are lower than what is exhibited for an ionic compound. The coordination of metal and carbonyl groups can occur between polymer chains with the exception being the copper based polymer which only exhibits two distinct peaks indicating that the coordination may only be of the intra-chain type. Not wishing to be bound by theory, but the reasoning behind this could be due to copper being a hydrated form, as seen by the bright blue color of the polymer, in which the water acts as a shield against coordination of two chains. Each polymer exhibits a broad peak in the IR spectra above 3000 cm$^{-1}$ indicating the presence of water. Of the metallic polymers, aluminum and titanium based systems show the greatest amount of water based on the intensity and broadness of the —OH absorption.

TABLE 1

Determination of ligating mode using the difference (Δν) in asymmetric (ν$_{as}$) and symmetric (ν$_s$) stretching absorptions of carboxylate groups attached to metal center.

| Metal | ν$_{as}$ (COO) [cm$^{-1}$] | ν$_s$ (COO) [cm$^{-1}$] | Δν = ν$_{as}$ - ν$_s$ [cm$^{-1}$] | Binding Mode |
|---|---|---|---|---|
| Cd[a] | 1541 | 1427 | 114 | Bidentate |
| Zn[a] | 1535 | 1399 | 136 | Bidentate |
| Zn/Cd[a] | 1535 | 1399 | 136 | Bidentate |
| Cu[a] | 1590 | 1430 | 160 | Bidentate |
| Ca[a] | 1578 | 1435 | 143 | Bidentate |
| Ti[b] | 1575 | 1417 | 158 | Bidentate |
| Al[a] | 1605 | 1473 | 132 | Bidentate |

[a]Synthesized with sebacic acid;
[b]synthesized with pEGBC-250

Thermogravimetric analysis (TGA), confirms the presence of water in the metal ester polymers. From the thermograms, it is seen that two distinct weight losses occur for the polymers, each attributed to the removal of water from the system. It has been reported that water will form a layered shell around a metal nanoparticle within a polymer matrix. The first layer is water that is bound to the metal center and a second layer of loosely bound water held closer to the nanoparticle through van der Waals interactions. The third layer is formed by free water in the nanoparticle/polymer matrix. This trend seems to hold true for the prepared metal ester polymers in which the free water is removed upon heating the polymer to 115° C. and holding for 60 minutes, while the loosely bound and bound water is removed at 220° C. Each metal ester polymer has differing amounts of water with the aluminum and titanium systems exhibiting the highest quantity which corroborates what was seen in the IR spectra. The metal ester polymers all exhibit thermal degradation at temperatures >250° C., while poly (chloroaluminum pEGBC-600) is the only polymer to exhibit a glass transition temperature, -25° C.

Dielectric Properties of Aluminum Polymers

The solubility of the aluminum polyesters that incorporate the ether dicarboxylates allow for them to be solution casted. A film of p(ClAl pEGBC-250) cast from a 50/50 (v/v) water/acetonitrile solution cracks upon drying and thus a multi-layer film is made in order to do dielectric measurements. On the other hand p(ClAl pEGBC-600) was solution cast from water onto a Teflon sheet to form a flexible free standing film that became more brittle as it was dried. Though these polymers exhibit high dielectric constants, >6, they also display both a high dissipation factor, >10% for most polymer films tested, as well as conductivities on the order of 10$^6$ pSm$^{-1}$. The high dielectric constant, high dielectric dissipation and conductivity is all attributed to the sheer amount of water in the sample, 4.9:1 and 3.4:1 (mol:mol) of water:aluminum for p(ClAl pEGBC-250) and p(ClAl pEGBC-600), respectively, though the 4.9:1 result is expected to be slightly higher due to the remaining DMAc in the sample which is observed in the $^1$H NMR. The coordination of water to aluminum forms an octahedral complex, but versus the other metallic polymers the aluminum octahedral complex contains a negative charge on the aluminum due to the fact that aluminum has only three valence electrons, but in this case four bonds are formed with the aluminum. Therefore, the electrostatic charge created is adding to the total ionic polarizability of the polymer but also allowing for the increase in charge movement between chains due to the amount of free water in the polymer, approximately 9.7 and 3.0% for p(ClAl pEGBC-250) and p(ClAl pEGBC-600), respectively. Attempts were made to improve the dielectric properties through extensive drying. In the case of p(ClAl pEGBC-250), upon drying the sample at 115° C. for 3 days there was some improvement in the dissipation, though still much greater than 10%. The dielectric constant and conductivity of the sample was decreased as a result of water and residual solvent being driven off which was expected. Comparing the dielectric results of p(ClAl pEGBC-250) to p(ClAl pEGBC-600), p(ClAl pEGBC-600) was expected to have a higher dielectric constant due to the increase in the number of ether linkages in EGBC-600 versus EGBC-250. Again the dissipation and conductivity of p(ClAl pEGBC-600) were quite large. The removal of free water seems to improve dissipation and conductivity.

Dielectric Properties of Alkaline Earth and Transition Metal Polymers

Pellets of the titanium, cadmium and copper containing polymers were pressed and dielectric properties evaluated in the frequency domain, FIG. 1. The trend in dielectric constant follows the expected trend, in which the lower the electronegativity value of the metal the higher the dielectric constant, Ti>Cd>Cu, due to the increased difference in electronegativity versus oxygen, Ti<Cd<Cu according to the Pauling scale. The much larger dielectric constant value of titanium may stem from the type of complex forming in which all three materials are in an octahedral geometry with the difference being the fact that titanium is covalently bound to four oxygen atoms and coordinated with two more whereas cadmium and copper only have two covalent bond with oxygen and the other bonds are coordination type. Therefore, titanium would have a larger orientational polarization versus the others. Also, the diacid used in the synthesis of the titanium polymer is different than the cadmium and copper diacid. The titanium polymer has ether linkages in the backbone which increase the dipole density within the polymer. The increase in the dissipation of the titanium polymer may be attributed to the heightened facility of titanium to bind water which may increase the conductivity due to the water shell allowing the transfer of charge carriers.

As a consequence of the increased dielectric dissipation in the titanium polymer, only the copper and cadmium polymers were tested in the time-domain. Poly(copper sebacate) shows a very consistent dielectric constant, with only a slight increase as the temperature is increased from room temperature to 150° C., averaging 3.3 and 3.5, respectively. As for poly(cadmium sebacate) the increase in dielectric constant is from 3.5 to 4.2 at room temperature and 125° C., respectively. Again, the difference in the dielectric constant between the two polymers is attributed to the increased dipole moment of the cadmium-oxygen bond versus the copper-oxygen bond and the increased ionic nature of the water-cadmium and carboxylate-cadmium coordination bonds both being a result of the lower electronegativity of cadmium compared to copper. However, the trend in dielectric properties versus temperature is different for each polymer. The dielectric constant first increased for poly(copper sebacate) as the temperature was incrementally increased to 50° C., followed by a decrease at both 75 and 100° C., then increased as the temperature was raised to 150° C. However, the dielectric constant increased as the temperature was raised for poly(cadmium sebacate). The difference in trends could be attributed to how strong the water is coordinated to the metal center as explained previously. Both polymers contain about the same mole ratio of water versus metal, 0.7:1 and 0.5:1 for the cadmium and copper polymer, respectively. The copper polymer is expected to lose water more easily and the increase in dielectric constant at 50° C. is from the increase of the copper-carboxylate dipole in addition to the water dipole. The decrease in dielectric constant is then from the loss of water in the polymer. At higher temperatures the dielectric constant increases as a result of the higher mobility of the copper-carboxylate dipole. Therefore, the free water in the polymer may not be as significant as the second layer of water and how tightly it is held by van der Waals forces to the metal since the cadmium only shows enhancement of the dielectric constant as temperature increases. The trend in dissipation for both polymers follows that of their respective dielectric constants. The dissipation factor for poly(copper sebacate) remains on the order of $10^{-2}$ for all temperatures while the dissipation factor of poly(cadmium sebacate) increases to $10^{-1}$ orders of magnitude at 125° C.

From the time-domain spectra of poly(cadmium sebacate) at different measurement temperatures, the role of bound water on dielectric properties were further evaluated. The pellet was first held at 125° C. overnight and measured again at 125 and 25° C. The dielectric constant and dissipation remained the same for both measurements at 125° C. However, when measuring the pellet a second time at 25° C., there was a slight increase in the $\in'$ and a decrease in $\in''$ which improves the dissipation factor of the polymer as well as a decrease in conductivity. Again the improvement can be attributed to the loss of water from the second layer, which aids in charge carrier movement as described before. It has reported that in "wet" polyimides the dielectric constant increases due to the adsorbed water but that the dipole moment of water was decreased due hindered dipole mobility due to hydrogen bonding between water and amide group. This seems to be what is observed for the cadmium polymer, in which the second layer not only has van der Waals interactions with the metal center but is also hydrogen bonding with the bound water which could be leading to a decrease in the dipole moment. When this second layer of water is driven off, the total dipole moment of the polymer increases leading to a higher dielectric constant. The heating cycle was repeated at 150° C. and again when measuring the pellet at 25° C., there was another increase in $\in'$ but the dissipation factor remained constant signifying a slight increase in $\in''$ as well.

The singular forms "a," "an," and "the" include plural referents unless the context clearly dictates otherwise. "Or" means "and/or." The endpoints of all ranges directed to the same component or property are inclusive and independently combinable. Disclosure of a narrower range or more specific group in addition to a broader range is not a disclaimer of the broader range or larger group.

Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless specifically otherwise indicated, each of the foregoing groups can be unsubstituted or substituted, provided that the substitution does not significantly adversely affect synthesis, stability, or use of the compound or polymer. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; alkanoyl (such as a C2-6 alkanoyl group such as acyl); carboxamido; C1-6 or C1-3 alkyl, cycloalkyl, alkenyl, and alkynyl (including groups having at least one unsaturated linkages and from 2 to 8, or 2 to 6 carbon atoms); C1-6 or C1-3 alkoxys; C6-10 aryloxy such as phenoxy; C1-6 alkylthio; C1-6 or C1-3 alkylsulfinyl; C1-6 or C1-3 alkylsulfonyl; aminodi(C1-6 or C1-3)alkyl; C6-12 aryl having at least one aromatic rings (e.g., phenyl, biphenyl, naphthyl, or the like, each ring either substituted or unsubstituted aromatic); C7-19 alkylenearyl having 1 to 3 separate or fused rings and from 6 to 18 ring carbon atoms, with benzyl being an exemplary arylalkyl; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A transition metal or group II metal ester polymer comprising units of formula (I), (II), or (III):

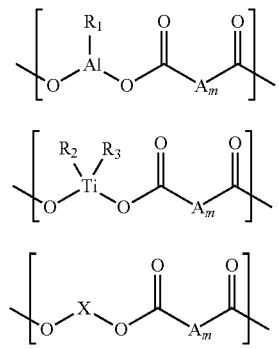

wherein
R$_1$ is halogen, —OH, H$_2$O, amine, substituted or unsubstituted C$_{1-12}$ alkyl, substituted or unsubstituted C$_{3-12}$ cycloalkyl, substituted or unsubstituted C$_{6-12}$ aryl, substituted or unsubstituted C$_{3-6}$ heteroalkyl, substituted or unsubstituted C$_{2-12}$ alkynyl, or substituted or unsubstituted C$_{2-12}$ alkynyl;
R$_2$ and R$_3$ are each independently C$_{1-12}$ alkoxy, amine, monoC$_{1-12}$ alkyl amine, or di C$_{1-12}$ alkyl amine;
X is Ca, Cd, Cu, Zn, or a combination thereof;
A is a substituted or unsubstituted C$_{1-36}$ hydrocarbylene, a divalent heteroaryl, or an ether; and
m is 0 or 1.

2. The polymer of claim 1, wherein the polymer is coordinated with a high dielectric constant ligand.

3. The polymer of claim 2, wherein the high dielectric constant ligand is water; ammonia; hydrogen sulfide; an alcohol; an amine; or a thiol.

4. The polymer of claim 1, wherein R$_1$ is halogen.

5. The polymer of claim 1, wherein R$_2$ and R$_3$ are each independently unsubstituted —OC$_{1-6}$ alkyl.

6. The polymer of claim 1, wherein A is substituted or unsubstituted C$_{1-12}$ alkyl, substituted or unsubstituted C$_{3-12}$ cycloalkyl, substituted or unsubstituted C$_{6-12}$ aryl, substituted or unsubstituted C$_{3-6}$ heteroalkyl, substituted or unsubstituted C$_{2-12}$ alkenyl, substituted or unsubstituted C$_{2-12}$ alkynyl, substituted or unsubstituted C$_{6-12}$ heteroaryl, or a substituted or unsubstituted C$_{1-36}$ alkyl whose chain is interrupted by one or more units of substituted or unsubstituted C$_{6-12}$ aryl or one or more units of substituted or unsubstituted C$_{6-12}$ heteroaryl.

7. The polymer of claim 1, wherein A is substituted or unsubstituted C$_{1-12}$ alkyl.

8. The polymer of claim 1, wherein A is —O—(—R$_4$—O—)$_n$— wherein each R$_4$ is independently a divalent C$_{1-8}$ alkyl or divalent C$_{3-12}$ cycloalkyl, and n is 1 to 12, specifically 1 to 10, and more specifically 1 to 6.

9. The polymer of claim 1, wherein the polymer is poly(chloroaluminum glutarate), poly(chloroaluminum sebacate), poly(chloroaluminum poly(ethyleneglycol)bis(carboxymethyl) ether-250), poly(chloroaluminum poly(ethyleneglycol)bis(carboxymethyl) ether-600), poly(chloroaluminum 20:80 glutarate:poly(ethyleneglycol)bis(carboxymethyl) ether-600), poly(chloroaluminum 50:50 glutarate:poly(ethyleneglycol)bis(carboxymethyl) ether-600), poly(chloroaluminum 80:20 glutarate:poly(ethyleneglycol)bis(carboxymethyl) ether-600), poly(chloroaluminum 50:50 poly(ethyleneglycol)bis(carboxymethyl) ether-250:3,3-dimethylglutarate), poly(chloroaluminum 60:40 poly(ethyleneglycol)bis(carboxymethyl) ether-250:3,3-dimethylglutarate), poly(chloroaluminum 75:25 poly(ethyleneglycol)bis(carboxymethyl) ether-250:3,3-dimethylglutarate), poly(chloroaluminum 80:20 poly(ethyleneglycol)bis(carboxymethyl) ether-250:3,3-dimethylglutarate), poly(chloroaluminum 90:10 poly(ethyleneglycol)bis(carboxymethyl) ether-250:3,3-dimethylglutarate), poly(chloroaluminum 95:5 poly(ethyleneglycol)bis(carboxymethyl) ether-250:3,3-dimethylglutarate), poly(cadmium sebacate), poly(copper sebacate), poly(zinc sebacate), poly(50:50 cadmium:zinc sebacate), poly(calcium sebacate), poly(diethoxytitanium poly(ethyleneglycol)bis(carboxymethyl) ether-250), or combinations comprising at least one of the foregoing.

10. The polymer of claim 1, wherein a dielectric constant, ∈, of the polymer is greater than or equal to 3.0.

11. The polymer of claim 1, wherein the polymer has a thermogravimetric analysis onset temperature of greater than or equal to 200° C.

12. A process for producing the polymer of claim 1, comprising
   a. contacting an organic dicarboxylic acid or derivative thereof and a diorganoaluminum halide;
   b. contacting an organic dicarboxylic acid or derivative thereof and a metal dihalide, wherein the metal is Ca, Cd, Cu, Zn, or a combination thereof; or
   c. contacting an organic dicarboxylic acid or derivative thereof and a dialkoxytitanium dihalide.

13. The process of claim 12, wherein contacting is in the presence of solvent.

14. A composition comprising the polymer of claim 1.

15. An article comprising the polymer of claim 1.

16. The article of claim 15, wherein the article is a capacitor, field effect transistor, electromechanical system, printed circuit, or photovoltaic.

* * * * *